United States Patent [19]

Furgason

[11] 3,813,927

[45] June 4, 1974

[54] MOISTURE TRANSDUCER

[76] Inventor: Leon M. Furgason, P.O. Box AK. 163rd S.W., Harlowton, Mont. 59036

[22] Filed: July 16, 1973

[21] Appl. No.: 379,238

[52] U.S. Cl. ................................................. 73/73
[51] Int. Cl. ........................................... G01n 25/56
[58] Field of Search ............... 73/73, 75, 15 R, 76; 324/65 R

[56] References Cited
UNITED STATES PATENTS

| 3,141,129 | 7/1964 | Dietert | 73/73 X |
| 3,216,241 | 11/1965 | Hansen | 73/15 R X |
| 3,497,803 | 2/1970 | Fegan | 324/65 R |
| 3,517,549 | 6/1970 | Teich | 73/73 |
| 3,714,818 | 2/1973 | Relph | 73/73 |

OTHER PUBLICATIONS

Cereal Science Today, "Moisture Measurement in the Grain Industry," Zeleny, Vol. 5, No. 5, May 1960, pp. 130–136.

*Primary Examiner*—Richard C. Queisser
*Assistant Examiner*—Stephen A. Kreitman
*Attorney, Agent, or Firm*—Schroeder Siegfried Ryan & Vidas

[57] ABSTRACT

A moisture transducer utilizing a heated surface with a temperature sensor therein which is heated from an electrical resistor to a predetermined temperature level with the temperature sensor controlling a current controller to maintain the heated level in the plate or surface. As material having varying moisture contents pass across the same, a loss of heat from the surface due to the absorption of heat by moisture in the material will reflect a change in current to maintain the plate at a predetermined temperature level, such current being a measure of the moisture content of the material passing over the plate.

12 Claims, 3 Drawing Figures

PATENTED JUN 4 1974 3,813,927

MOISTURE TRANSDUCER

My invention is directed to a moisture transducer and more particularly to an improved, compact and simplified moisture transducer adapted to provide an indication of the moisture content of a material moving in contact with the same.

Instrumentation for measuring moisture content and/or controlling moisture content of materials such as paper, grain, etc, in process control as well as instrumentation for measuring of moisture content of materials, such as soil, are known and in use. In the paper making industry, it is old to automatically determine moisture content of paper in a drying process by measuring temperature rise in paper when heat is applied thereto and indirectly measuring the temperature of the paper by measuring the temperature of the heated roller surface. When measurements are made at different points, the rate of heat flow from the heated roller surface to the paper passing over the same is proportional to the difference in temperature and consequently proportional to the moisture content of the same. Similar measurements may be made by determining the electrical conductivity of paper through continuous riding electrical contacts with the measurement of the current flow through the material being proportional to the moisture content. In other process control, the measurement of temperature change in a material at different points along a process line during a drying operation where a constant amount of heat is applied to the material can provide a predictable indication of the moisture content of the material. In soil measurement or stationary contact measurement, it is recognized to use heated moisture absorbing plates in a comparison circuit with a similar heated non-moisture absorbing plate in the measurement of moisture content of the soil brought in contact with the first named plate.

My improved moisture transducer is particularly adapted in connection with drying operation of granular materials such as grains, etc, or in the use of feed mixing processes where the moisture content of certain granular material forming a part of the feed must be known in order to determine the amount of moisture to be added or removed from the composite material for proper pelletizing of the same. In my improved invention relative movement between a heated sensing plate and the material whose moisture content is to be measured permits the moisture in the material to cause heat loss in the heated surface due to the conductive movement of heat to the stream of material. By using a temperature sensor in connection with the heated surface, a current controller supplying heat to the heated surface may be regulated to maintain a constant temperature of the surface therein and the measurement of change in the power applied to heat the surface to maintain the constant amount of heat or temperature will provide an indication of the moisture content of the material passing in contact therewith.

Therefore, it is the principal object of this invention to provide an improved moisture transducer.

Another object of this invention is to provide an improved moisture transducer of the electronic solid state type which requires no moving parts.

Another object of this invention is to provide in an improved moisture transducer a heating surface with a temperature sensor therein which adapted to be brought into relative movement with the material whose moisture content is to be measured to provide for a simplified installation of the same with a simple electrical connection to the remainder portion of the sensing and power circuit and an associated meter for accurate and continuous monitoring of the moisture content of the material.

A still further object of this invention is to provide an improved moisture transducer particularly adapted for the measurement of moisture content of grain either in a drying operation or in a feed mill pelletizing operation.

A still further object of this invention is to provide electronic moisture transducer which is easy to operate and maintain.

These and other objects of this invention will become apparent from the reading of the attached description together with the drawings therein.

Figure 1:
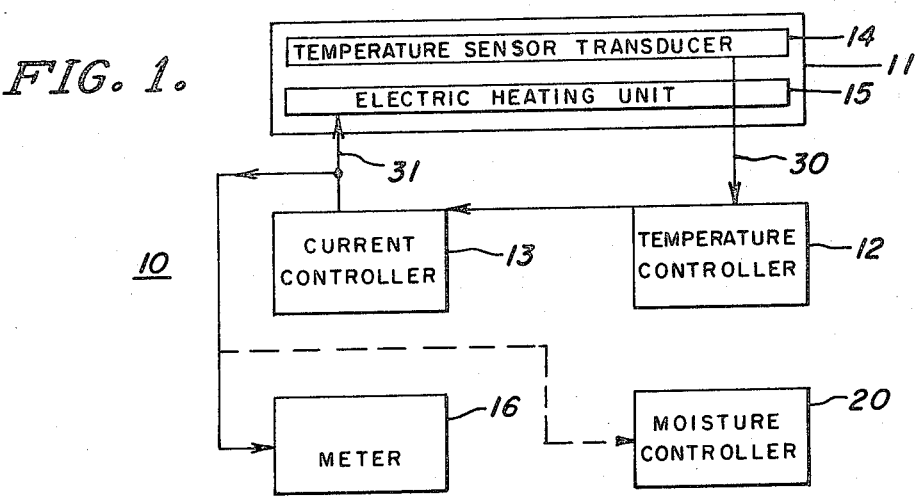
FIG. 1 is a schematic block diagram of the components of the transducer.

My improved moisture transducer is shown in the drawings in FIG. 1 in block form to indicate the various components of the same. As will be seen in FIG. 1, the moisture transducer, indicated generally at 10, includes a plate or surface 11 having positioned therein or associated therewith a temperature sensor transducer 14 and an electric heating unit 15. The temperature sensor transducer is connected to a temperature controller indicated at 12 whose output controls an electric current controller 13 with the electric current controller feeding or controlling the application of electric power to the electric heating unit 15 in the plate or surface 11. The output of the electric current controller is also fed through an electric current meter 16 or electrical indicating device which provides a proportional indication of moisture content of the material being moved across the surface or plate 11. While I have shown the surface as a flat plate herein, it will be understood that the surface may take varying geometric forms such as flat, curved, cylindrical, etc. As shown in dotted lines, this signal may also be utilized to energize or control a moisture controller, indicated generally at 20 in block form to provide a controlling function to associated apparatus where desired.

Figure 2:
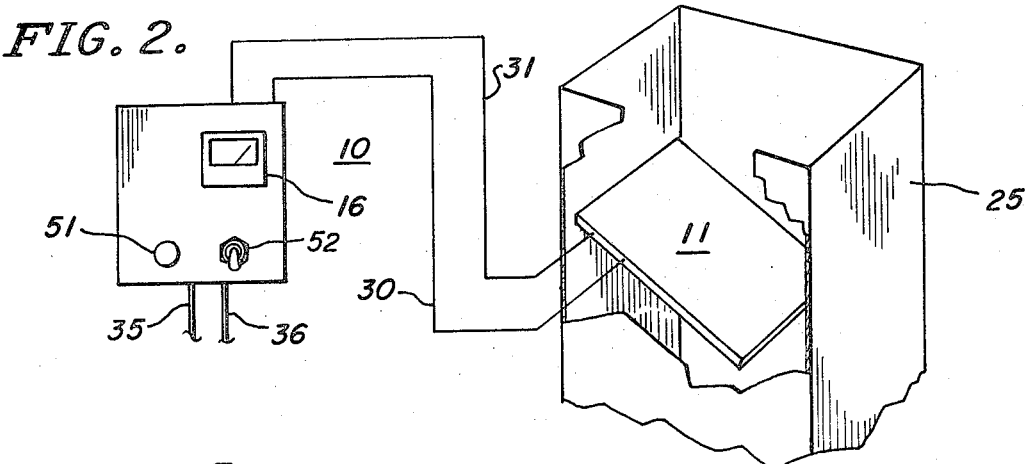
FIG. 2 is a schematic diagram of an application of the same.

The details of the structure may take varying forms and, as an example of an application thereof, a fragmentary showing of a duct at 25 in FIG. 2 discloses the mounting and location of the plate or surface 11 having the transducer and heater therein which is coupled by means of cabling indicated generally at 30 and 31 to a control panel which bears the designation 10 to indicate the control components of the transducer with the indicating meter 16 positioned thereon. Suitable power supplies indicated at 35 and 36 are shown in this schematic view to indicate different types of power inputs applied to the control panel or the transducer circuit as will be hereinafter identified.

While I have shown in FIG. 2 the plate positioned in a duct in an inclined manner, or such that material may be poured into the duct and move across the surface or plate in a wiping action as it descends therethrough by gravity or other means, it will be recognized that the plate or surface 11 may be positioned in any manner and material whose moisture content is to be determined moved relative thereto. The particular application is useful in determining moisture content of granular materials, such as grains, in a feed mill mixing and pelletizing operation wherein it is desired not only to provide an indication of the moisture content of the one or more materials in the mixing operation, but also to aid in the process of pelletizing or conditioning the same for feed. The improved moisture transducer may also be utilized in connection with a well-known application of grain drying or drying of granular material wherein relative movement between the plate and the material will provide a heat transfer between the material having moisture therein and the heated surface of the plate to produce a temperature change in the plate.

Figure 3:
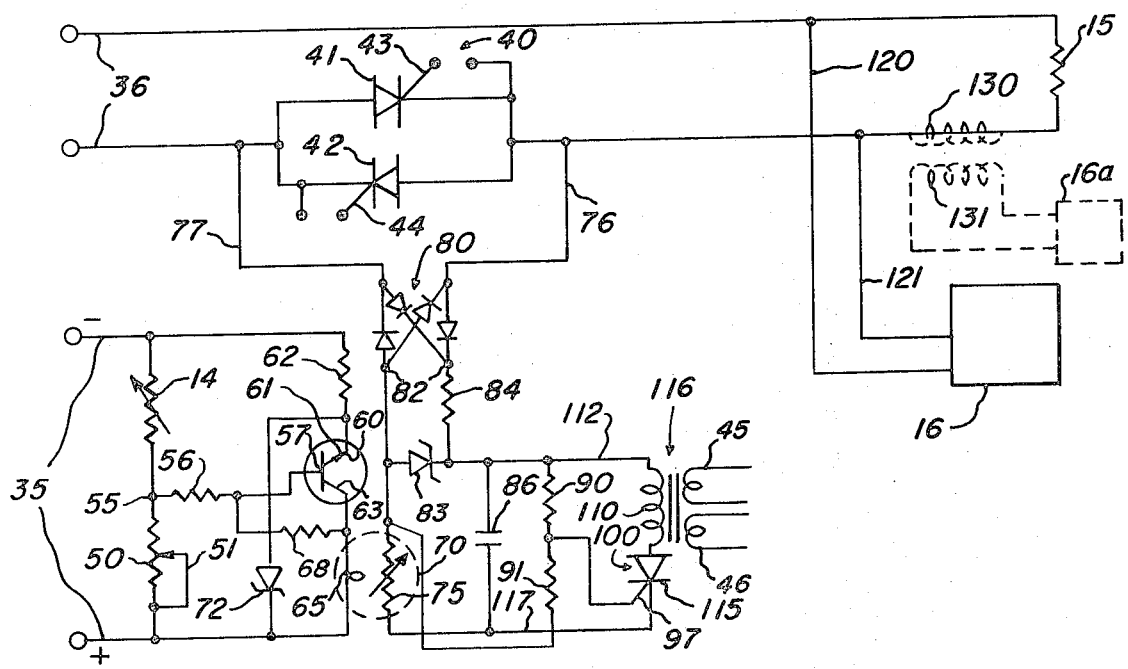
FIG. 3 is a schematic wiring diagram of a preferred embodiment of the moisture transducer.

In FIG. 3, I have shown a schematic circuit of the preferred embodiment of the invention. The input conductors 36 represent 120 volt alternating current source which is connected to the resistor element 15 through a pair of unidirectional rectifying means, indicated generally at 40. In the schematic circuit, these silicone controlled rectifiers or Thyristors 41, 42 are oppositely poled in a parallel relationship so that respective anodes and cathodes are connected to an opposite power electrode of the other in a parallel relationship and with the intermediate points in the parallel circuit or the extremities of the same being included in the supply conductors 36 completing the series circuit to the resistance element 15. The plate or surface 11 may be of metallic or ceramic construction and may be of varying forms but should have good thermal conductivity. The resistor element will preferably be embedded in the same or attached thereto in such a manner as to heat the surface which is to be contacted uniformly by the moist material. While I have shown Thyristors in the schematic circuit, it will be recognized that a Triac or other type of bidirectional recitfying device may be employed to provide a pulsating current through the resistor element from the alternating current source at a power sufficient to heat the same. In the drawings, the control gates or electrodes 43, 44, of the Thyristors are connected back in circuit with the cathode electrode and through secondary windings 45, 46 in a control circuit. These secondary windings provide the voltage pulses which control the firing of the rectifiers proportionally during the respective half cycles of the alternating current supply in such a manner as to vary the current flow through the resistor element for varying the heating of the same.

In the theory of operation of the improved moisture transducer, the material is brought into contact with the plate and is allowed to move across the surface of the same, such that the moisture content of the material or moisture therein will effect a cooling of the plate due to conversion of the moisture. The plate being uniformly heated, will be uniformly effected by this change in temperature. The plate will preferably be heated at or above the boiling point of water and a temperature sensing transducer 14 in the form of a thermistor will be placed in intimate contact with the same and embedded therein along the extent of the same and in proximity with the heating element to sense the temperature of the plate and respond to temperature changes thereof as materials of different moisture content are passed along the same. The control circuit for the sensing transducer or thermistor takes the form of the input power conductors 35 in the schematic circuit which are positive and negative 24 volt DC sources. The thermistor 14 is shown as a variable resistor in the circuit connected in series with an adjustable resistor 50 which resistor is adjustable to set the desired temperature operating point of the plate. On the face of the panel in FIG. 2, the adjusting knob 51 indicates the adjustable wiper of this resistor element 50 for the calibration or temperature adjustment and 52 indicates an on-off swith for the control circuit. The mid-point between the thermistor 14 and adjustable resistor 50 ar the point 55 is connected through a current limiting resistor 56 to the base 57 of the transistor indicated at 60. The latter has its emitter 61 connected to the voltage dividing resistor 62 and one side of the DC power source or the negative 24 volt side common with the thermistor 14 and with the divider circuit completed through a Zener diode 72 which is connected from the positive 24 volt side of the DC power source and to the emitter for maintaining the voltage level thereon. The collector electrode 63 of transistor 60 is connected through a lamp 65 of an optical isolator 70 and to the other side of the circuit or the positive 24 volt side. The current limiting resistor 56 is also connected to a negative feedback resistor 68 from the collector electrode 63 of transistor 60.

The optical isolator 70 has a photocell 75 (shown as a variable resistor at 75 in FIG. 3) connected to the current control portion of the circuit which is indicated at 13 in the block diagram. This is powered by the conductors 76, 77 connected on either side of the parallel circuit of the Thyristors or silicone controlled recitfying devices in the power circuit to take an alternating current signal in phase with the signal or power applied to the rectifiers. These connectors are connected to the input conductors of the full wave rectifier 80 with the output conductors 82 having Zener diode 83 and a current limiting resistor 84 connected to the same. One side of the Zener diode is connected through the variable resistance or photocell detector 75 and to one side of a charging capacitor 86 with the opposite side of the Zener diode 83 being connected to the opposite side of the charging capacitor 86. The Zener diode limits the peak voltage applied through the variable resistor or photocell 75 to charge the storage capacitor 86. A voltage divider or bias circuit formed of resistors 90 and 91 connected in series circuit are connected at one side to the Zener diode 83 with the opposite extremity of the bias circuit of resistor 91 being connected to the opposite side of the Zener diode 83. The mid-point of this bias circuit is connected to the control cathode gate 97 of a silicone controlled switch, indicated at 100. The anode of this circuit has in circuit therewith the primary winding 110 of a pulse transformer 116 whose opposite extremity is connected through conductor 112 to one side of the charging capacitor 86, common to the Zener diode. The cathode electrode 115 of the switch is connected through conductor 117 to the opposite side of the charging capacitor 86 so that the voltage impressed between cathode and anode will be the charge on the capacitor 86. The pulse transformer 116 has secondary windings 45, 46 coupled directly to the control grids of the Thyristors in a conventional manner for controlling the firing of the same.

In FIG. 3 we have shown the meter output circuit as conductors 120 and 121 connected to the supply conductors 36 in parallel with the heating resistor 15 to provide a voltage output signal in proportion to the voltage drop across the same, this circuit being connected to the indicating meter 16 which in this embodiment would be voltmeter receiving the zero to 120 voltage AC pulsating output to provide the indication of the change in current flow and hence the change in voltage drop across the resistor 15 with change in temperature sensed. Indicated in block form in FIG. 3 is a current transformer, shown in dotted form at 130, and having it primary winding connected around one of the power conductors 36 feeding resistor 15 with a secondary winding 131 leading to the meter 16a which embodiment will be a current meter of a conventional type to sense current flow through the resistor 15 in series circuit. The two meters could be combined if desired to provide a watt-meter effect which in the block disclosure could be the equivalent of the meter 16 to provide an indication of the amount of power consumed by the resistor or change in power by change in temperature of the same.

In the operation of my improved moisture transducer, the plate or surface 11 is heated to a predetermined temperature. Depending upon the application of the same, this temperature would be at or above the boiling point of water and current flow through the resistor 15 embedded therein or in contact with the same would heat the resistor and maintain the plate or surface of this particular temperature level. The sensing temperature probe, also in intimate contact with the plate or surface, will sense the uniform temperature of the same. The plate or surface will be of a good heat conductor material and the application of the heat thereto will effect a change in temperature of the same as materials having different moisture content move across the surface of the same. Moisture in the material contacting the plate will absorb heat effecting cooling of the plate. The temperature sensor 14 in sensing the change of temperature of the same will offset or vary the voltage at the point 55 since the resistance value of the thermistor 14 will be changed. This will control the bias supplied to the base 57 of the transistor 60 providing increased current flow through the lamp at a point where the lamp will become more illuminated. Isolation between the DC control circuit of the temperature sensor and the current controller is affected through an optical isolator and the illumination level of the lamp will be detected by the photocell 75 associated therewith. The current control portion of the circuit receives its power input from the alternating current source across the controlling rectifiers or Thyristors. The full wave rectifier 80 associated therewith provides the conventional full wave or pulsed energization with the plus side having a current limiting resistor 84 in the series therewith. The Zener diode limits the peak voltage applied through the variable resistor or photocell 75 in the charging of the storage capacitor 86. As the optical isolator receives more illumination, the variable resistance value of the photocell drops increasing the charging current to the capacitor on each pulse from the full wave rectifier to vary the voltage applied across the same. This is applied across the primary winding 110 of the pulse transformer and between the anode and cathode electrodes of the silicone controlled switch 100. The voltage dividing network or resistors 90, 91 receiving a fixed energization across the Zener diode or the pulsed energization across the same will provide a voltage signal to the control cathode gate 97 which will provide the gating control voltage level at some point corresponding with the energization applied from the capacitor to fire the silicone controlled switch energizing the primary winding 110 of the pulse transformer. This will control the application of the pulse at a particular point in the half cycle to the primary winding so that the secondary windings will gate through the control gates of the silicone control rectifiers on alternate half cycles in accord with the energization from the photocell. It will be understood that the adjustable resistor 50 will be adjusted so that the thermistor will provide for maintaining the plate or surface 11 at the desired temperature level. As additional heat is required with the presence of moisture in contact with the plate cooling the same, additional current flow will be effected by a change in the length of firing of the Thyristors with a change in the control gate pulses applied to the silicone control rectifiers to change the firing of the same and allow an increased current flow to the heating resistor 15 in the plate. This will be reflected on the meter as an increase in the moisture content of the material passing over the plate. It will be proportional to the moisture content of the material as an indication thereof and can be sensed as a change in voltage across the heating resistor or a change in current flow through the energizing conductor as shown by the volt meter 16 or current meter 16a in FIG. 3.

In considering this invention it should be remembered that the present disclosure is illustrative only and the scope of the invention should be determined only by the appended claims.

What is claimed is:

1. A moisture transducer comprising, a structure including a surface having good heat conductivity, a heating resistor associated with said surface and adapted to heat the same, a power circuit means including a power source and a switch means controlling the application of electric power to the heating resistor associated with the surface, a temperature sensor positioned in contact said surface and adapted to respond to the temperature thereof, a controlling circuit connected to said temperature sensor and controlled thereby, said controlling circuit being coupled to said switch means to control the operation of the power circuit means, said surface with the heating resistor and temperature sensor being positioned for relative movement with a flow of material whose moisture content is to be measured such that as the material and the surface move relatively and with moisture in said material absorbing heat and causing a change in temperature of the heated surface, said temperature sensor responding to the change in temperature of the surface and causing through said controlling circuit operation of the switch means to increase the flow of electric power to the heating resistor to restore the temperature of the surface to a predetermined level, and meter means associated with the power circuit means and responsive to a change in the amount of power applied to the heating resistor to maintain said surface at said surface at said predetermined temperature level, said meter providing a proportional indication of the moisture content of the material contacting said surface.

2. The moisture transducer of claim 1 in which the switch means in the power circuit means is an electronic switch.

3. The moisture transducer of claim 2 in which the source of power is an alternating current source of power and the electronic switch is formed of back to back SCRs providing a pulsating AC current of varying average value to the heating resistor.

4. The moisture transducer of claim 3 in which the temperature sensor is a thermistor positioned in an energizing circuit and connected in series with an adjustable resistor to control the operation of an electronic switch means which controls in the controlling circuit the generation of control voltage pulses applied to the control gates of the SCRs.

5. The moisture transducer of claim 4 in which the controlling circuit includes an optical coupling between the electronic switch means controlled by the thermistor and a phase sequenced circuit connected to the power circuit means and providing pulsed signals therefrom through a control transformer to the control gates of the SCRs.

6. The moisture transducer of claim 4 in which the controlling circuit means includes means connected to the power circuit means and providing pulsed voltage signals therefrom adapted to be applied to the control gates of the SCRs with an isolating coupling means connecting the thermistor of the temperature sensor in the pulse generating means.

7. The moisture transducer of claim 5 in which the optical coupling includes a lamp and a photocell optically associated therewith and providing signal outputs in accord with changes in output of the thermistor to provide for the generation of electrical pulses in the control gates of the SCRS.

8. The moisture transducer of claim 2 in which the meter means is an electronic voltmeter connected across the heating resistor to receive pulsed voltage signals applied thereto as an indication in change of energization of said heating resistor.

9. The moisture transducer of claim 2 in which the heated surface is a plate and the thermistor is a probe positioned in the plate with a heating resistor embedded in the plate.

10. The moisture transducer if claim 2 in which the meter is responsive to current flow in the power circuit as an indication of the power supplied to the heating resistor to maintain the surface at said predetermined temperature.

11. The moisture transducer of claim 9 in which said plate is made of a metallic material.

12. The moisture transducer of claim 9 in which the plate is made of a ceramic material.

* * * * *